UNITED STATES PATENT OFFICE.

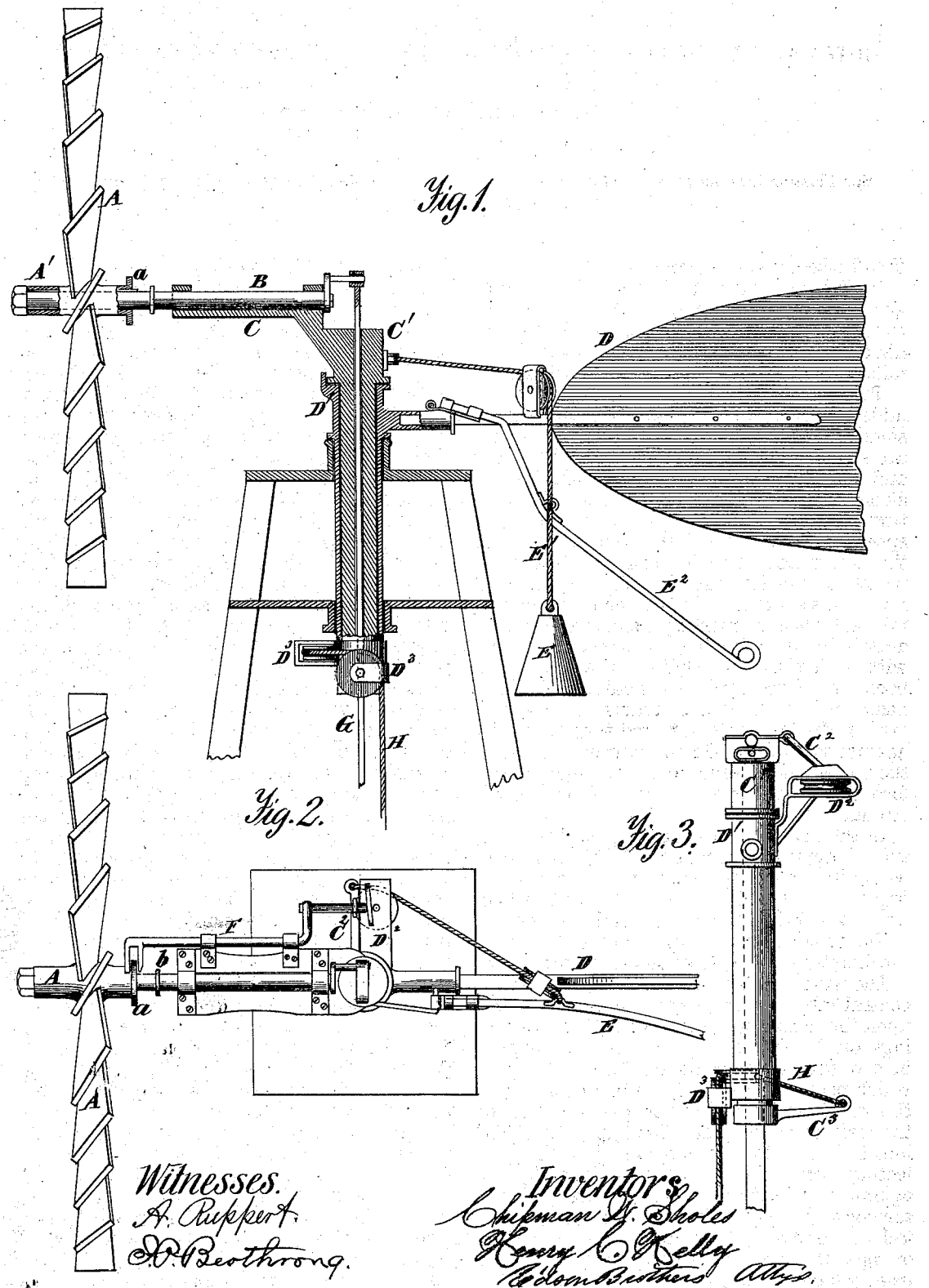

CHIPMAN W. SHOLES AND HENRY C. KELLY, OF MORRISON, ILLINOIS.

IMPROVEMENT IN WINDMILLS.

Specification forming part of Letters Patent No. 156,316, dated October 27, 1874; application filed March 17, 1874.

*To all whom it may concern:*

Be it known that we, CHIPMAN W. SHOLES and HENRY C. KELLY, of Morrison, in the county of Whitesides and State of Illinois, have invented certain Improvements in Windmills, of which the following is a specification:

This invention relates to that class of windmills in which the wheel and tail can turn to some extent independently of each other, and are so disposed with reference to each other and intermediate devices that whenever the strength of the wind exceeds that required to turn the wheel at the proposed maximum speed, the wheel will first automatically turn the tail, which then in turn will throw the wheel more or less out of wind. My improvement consists mainly in the combination of a tail and wheel supporting frame, turning separately in one direction on a common axis, with a horizontally-sliding wheel carrying back and forth with it a sliding rod which bears with its outer end against a projecting arm on the tail or its hub, and turns such tail against the weight of a counterpoise to throw the wheel out of wind in the manner heretofore stated whenever the wind becomes too strong.

In the annexed drawings, Figure 1 is a vertical longitudinal section of my improved windmill. Fig. 2 is a plan view of the same. Fig. 3 is an elevation of the hubs of the wheel frame and tail and their connecting devices.

The same letters of reference are used in all the figures in the designation of identical parts.

The wings of the wheel A radiate from a central hub, $A'$, by means of which it is mounted upon the horizontal shaft B, turning in bearings on the frame C. The latter terminates in a downwardly-projecting tubular hub, $C^1$, which passes through the tubular hub $D^1$ of the tail D, supported in vertical bearings on the main frame or post. The upper end of the hub $C^1$ is provided with a fixed laterally-projecting arm, $C^2$, which, when brought up against the fixed bracket $D^2$ on the hub $D^1$, arranges the axis of the wheel in line with the tail. A counter-weight, E, attached by a cord or rope, $E^1$, to the outer end of the arm $C^2$, from which it passes over a pulley on the bracket $D^2$, and another one on the tail, as best seen in Fig. 2, sustain the wheel at right angles to the tail under all ordinary circumstances. The rope $E^1$ is also fastened to a hinged arm or lever, $E^2$ on the tail, by means of which the weight E may be lifted more or less to cause the wheel to be turned by the wind, so as to stand obliquely with reference to the tail, and, consequently, the direction of the wind. The wheel is arranged to slide on its shaft the moment the wind becomes stronger than required to turn the mill at the highest desirable velocity, and to turn the tail, in doing which it is itself thrown more or less out of wind. To this end, a collar, $a$, on its hub, enters between the forks projecting laterally from a bar, F, which, being supported in lugs on the frame C, bears with its outer end against a rib on bracket $D^2$ on the tail-hub, all as clearly exhibited in Fig. 2. The weight E is of such proportion that it will hold the parts in the positions exhibited in Fig. 2 until the wheel reaches its maximum speed. Passing that, the resistance of the weight is overcome, and the wheel sliding inward on its shaft turns, through the slide-bar F, the tail at an oblique angle to it, and the tail again immediately adjusting itself to the wind turns the wheel out of wind. In the example illustrated both the wheel and shaft are capable of longitudinal or sliding movement, the wheel sliding separately until it brings up against the collar $b$, after which both slide together. It is evident, however, that the wheel may be made fast on the shaft and both slid together. The extent of movement should be such that the slide-bar will remain in contact with the bracket until the wheel arrives at an angle of, say, forty-five degrees to the tail; but the wheel may be turned until it stands in a plane parallel to the tail. The wheel-shaft has a crank at its extreme end, which is connected to the slotted cross-head of the rod G, which passes through the hub $C^1$, and may be hitched to the plunger of a pump. The aperture through the hub $C^1$ is flat or angular, and the rod G is of corresponding form in cross-section, so that its cross-head will always remain in proper position relatively to the crank under varying positions of the wheel. The lower ends of the hubs $C^1$ and $D^1$ are, respectively, provided with a fixed arm, $C^3$, and fixed brackets $D^3$ and by means of a rope, H, fastened with or end to the arm C³, and moving over sheaves on the brackets D³. By pulling on the rope H the wheel may be thrown more or less out of wind to regulate its velocity.

We hereby disclaim the invention of Sylvester E. Ament for an improvement in windmills, filed April 21, 1873, in the United States Patent Office.

What I claim as my invention, and desire to secure by Letters Patent, is—

1. The wheel A A', sliding shaft B, collar a, sliding bifurcated bar F, frame C, and tubular hubs C¹ and D¹, having the ribbed bracket D², in combination, substantially as and for the purpose specified.

2. The arm C², rope E¹, weight E, tail D, and lever E², in combination with the wheel A A', shaft B, the collar a, bifurcated bar F, frame C, and hubs C¹ and D¹, with the ribbed bracket D², substantially as and for the purpose set forth.

In testimony whereof we have hereunto signed our names this 7th day of May, A. D. 1874, in the presence of two subscribing witnesses.

CHIPMAN W. SHOLES.
HENRY C. KELLY.

Witnesses:
V. ANSLEY,
W. E. SAVAGE.